(12) United States Patent
Gao

(10) Patent No.: US 9,674,787 B2
(45) Date of Patent: Jun. 6, 2017

(54) INFORMATION PROCESSING METHOD AND ELECTRONIC DEVICE

(71) Applicant: Lenovo (Beijing) Co., Ltd., Beijing (CN)

(72) Inventor: Chengguo Gao, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 80 days.

(21) Appl. No.: 14/092,137

(22) Filed: Nov. 27, 2013

(65) Prior Publication Data
US 2014/0148225 A1    May 29, 2014

(30) Foreign Application Priority Data
Nov. 28, 2012    (CN) .......................... 2012 1 0497459

(51) Int. Cl.
*H04M 1/00*    (2006.01)
*H04W 52/02*    (2009.01)

(52) U.S. Cl.
CPC .............................. *H04W 52/0254* (2013.01)

(58) Field of Classification Search
CPC ......... H04M 2250/12; H04M 2250/22; H04W 52/027; H04W 4/12
USPC ......................................................... 455/566
See application file for complete search history.

(56) References Cited

U.S. PATENT DOCUMENTS

| 8,823,507 | B1* | 9/2014 | Touloumtzis | H04L 67/24 340/501 |
| 2008/0191892 | A1* | 8/2008 | Kirkup et al. | 340/686.6 |
| 2009/0160541 | A1* | 6/2009 | Liu | G06F 1/3228 327/544 |
| 2010/0115259 | A1* | 5/2010 | Elsila et al. | 713/100 |
| 2011/0081889 | A1* | 4/2011 | Gao et al. | 455/411 |
| 2013/0222236 | A1* | 8/2013 | Gardenfors | G06F 3/03 345/156 |

FOREIGN PATENT DOCUMENTS

| CN | 101287241 A | 10/2008 |
| CN | 101345958 A | 1/2009 |
| CN | 101883186 A | 11/2010 |
| CN | 102170497 A | 8/2011 |

OTHER PUBLICATIONS

First Chinese Office Action regarding Application No. 201210497459.8 dated May 5, 2015. English translation provided by Unitalen Attorneys at Law.

* cited by examiner

*Primary Examiner* — Dung Hong
(74) *Attorney, Agent, or Firm* — Harness, Dickey & Pierce, P.L.C.

(57) ABSTRACT

An information processing method and an electronic device are provided. In the method, when an event to be processed is received by an electronic device, a control instruction is generated. The electronic device generates prompting information and controls a display unit of the electronic device to be in a dark state in response to the control instruction. Finally the electronic device outputs the generated prompting information by a first prompting unit in the electronic device.

10 Claims, 1 Drawing Sheet

INFORMATION PROCESSING METHOD AND ELECTRONIC DEVICE

This application claims the priority to Chinese Patent Application No. 201210497459.8, entitled "INFORMATION PROCESSING METHOD AND ELECTRONIC DEVICE", filed with the Chinese State Intellectual Property Office on Nov. 28, 2012, which is incorporated by reference in its entirety herein.

FIELD

The present disclosure relates to the field of electronic technology, and in particular to an information processing method and an electronic device.

BACKGROUND

With the development of electronic technology, electronic devices have more and more functions. For example, an sound output device and a vibration device are provided in the existing mobile phone, and when an incoming call request is received by a user's mobile phone, the sound input device and the vibration device in the mobile phone will prompt the user, and the display screen of the mobile phone will also be illuminated, to give the user a timely and effective prompt.

However, the following technical problem or disadvantage in the prior art is found during the implementation of the disclosure:

when an event to be processed is received by an electronic device (for example, a mobile phone) in the prior art, the electronic device will start all of the prompting devices to prompt the user, the promoting power consumption of the electronic device is high and the promoting power consumption will be waste if the user is outside of the prompting region.

SUMMARY

An information processing method and an electronic device are provided according to the present disclosure, to solve the technical problem in the prior art that when an event to be processed is received by an electronic device, the electronic device will start all of the prompting devices to prompt the user, the promoting power consumption of the electronic device is high and the promoting power consumption will be waste if the user is outside of the prompting region.

An information processing method is provided, which is applied to an electronic device, the electronic device includes a display unit and a first prompting unit, and the method includes:

generating a control instruction when an event to be processed is received by the electronic device;

generating prompting information and controlling the display unit to be in a dark state in response to the control instruction; and outputting the prompting information by the first prompting unit.

Optionally, the method may further include, after outputting the prompting information by the first prompting unit, detecting whether an operator is in a predetermined region corresponding to the electronic device and generating a detection result;

generating a display starting instruction if the detection result indicates that an operator is in the predetermined region;

starting the display unit based on the display starting instruction, to make the display unit be in an illuminated state.

Optionally, the detecting whether an operator is in a predetermined region corresponding to the electronic device and generating a detection result may include:

collecting image information in the predetermined region by an image collecting apparatus in the electronic device; and determining whether an operator is in the predetermined region by analyzing the image information, and generating the detection result.

Optionally, the detecting whether an operator is in a predetermined region corresponding to the electronic device and generating a detection result may include:

acquiring first infrared information in the predetermined region by an infrared detection apparatus in the electronic device; and determining whether an operator is in the predetermined region by analyzing the first infrared information, and generating the detection result.

Optionally, in a case that the first prompting unit is a sound prompting unit and/or a vibration prompting unit, the method may further include, after outputting the prompting information by the first prompting unit, acquiring a first duration during which the prompting information is output by the sound prompting unit and/or the vibration prompting unit;

judging whether the first duration exceeds a first predetermined time period and generating a first judgment result;

generating an execution instruction if the first judgment result indicates that the first duration exceeds the first predetermined time period; and adjusting output intensity of the prompting information of the sound prompting unit and/or the vibration prompting unit from a first intensity to a second intensity based on the execution instruction, where the second intensity is lower than the first intensity.

Optionally, the method may further include, after adjusting the output intensity of the prompting information of the sound prompting unit and/or the vibration prompting unit from the first intensity to the second intensity, acquiring a second duration during which the prompting information is output by the sound prompting unit and/or the vibration prompting unit;

judging whether the second duration exceeds a second predetermined time period and generating a second judgment result;

generating a stopping instruction if the second judgment result indicates that the second duration exceeds the second predetermined time period; and stopping outputting the prompting information by the sound prompting unit or the vibration prompting unit based on the stopping instruction.

Optionally, the first prompting unit may be a speaker or a vibration sensor.

Optionally, the event to be processed may be an incoming call request, a new short message or a new email.

An electronic device is provided, which includes:

a first instruction generating unit, adapted to generate a control instruction when an event to be processed is received by the electronic device;

a responding unit, adapted to generate prompting information and control a display unit to be in a dark state in response to the control instruction; and a prompting unit, adapted to output the prompting information.

Optionally, the electronic device may further include:

a detecting unit, adapted to detect whether an operator is in a predetermined region corresponding to the electronic device and to generate a detection result;

a second instruction generating unit, adapted to generate a display starting instruction if the detection result indicates that an operator is in the predetermined region; and a control unit, adapted to start the display unit based on the display starting instruction to make the display unit be in an illuminated state.

Optionally, the detecting unit may include:

an image collecting module, adapted to collect image information in the predetermined region by an image collecting apparatus in the electronic device;

an analyzing module, adapted to analyze the image information to determine whether an operator is in the predetermined region and to generate the detection result.

Optionally, the electronic device may further include:

an acquiring unit, adapted to acquire a first duration during which the prompting information is output by an sound prompting unit and/or a vibration prompting unit;

a judging unit, adapted to judge whether the first duration exceeds a first predetermined time period and to generate a first judgment result;

an execution instruction generating unit, adapted to generate an execution instruction if the first judgment result indicates that the first duration exceeds the first predetermined time period; and an executing unit, adapted to adjust output intensity of the prompting information of the sound prompting unit and/or the vibration prompting unit from a first intensity to a second intensity based on the execution instruction, where the second intensity is lower than the first intensity.

There are at least the following technical effects or advantages according to one or more embodiments of the present disclosure.

In embodiments of the present disclosure, after receiving information to be processed by the electronic device, the electronic device does not directly start the display unit, but determines whether the display unit needs to be started by detecting whether an operator is in a predetermined region of the electronic device, thereby solving the technical problem in the prior art that when an event to be processed is received by an electronic device, the electronic device will start all of the prompting devices to prompt the user, the promoting power consumption of the electronic device is high and the promoting power consumption will be waste if the user is outside of the prompting region. Therefore, the waste of the promoting power consumption of the electronic device is effectively reduced, and the efficiency of information prompting of the electronic device is also improved.

In embodiments of the present disclosure, if the information to be processed on the electronic device is not processed within a predetermined prompting time period, the electronic device reduces the output intensity of the prompting information of the prompting unit in the electronic device, thereby reducing the power consumption waste of the prompting unit in the electronic device, and increasing the stand-by time of the electronic device.

DETAILED DESCRIPTION

An information processing method and an electronic device are provided according to the present disclosure. In the method, the electronic device, when receiving an event to be processed, generates a control instruction; then generates prompting information and controls a display unit of the electronic device to be in a dark state in response to the control instruction; and finally outputs the generated prompting information by a first prompting unit of the electronic device. Therefore, it solves the technical problem in the prior art that when an event to be processed is received by an electronic device, the electronic device will start all of the prompting devices to prompt the user, the promoting power consumption of the electronic device is high and the promoting power consumption will be waste if the user is outside of the prompting region.

Technical solutions of the present disclosure will be described in detail below in conjunction with the accompanying drawings and embodiments. It should be understood that embodiments of the present disclosure and technical features in the embodiments are only for illustrating the technical solutions of the present disclosure, but not intend to limit the technical solutions of the present disclosure. The embodiments and technical features in the embodiments may be combined with each other if there is no conflict.

Figure 1:
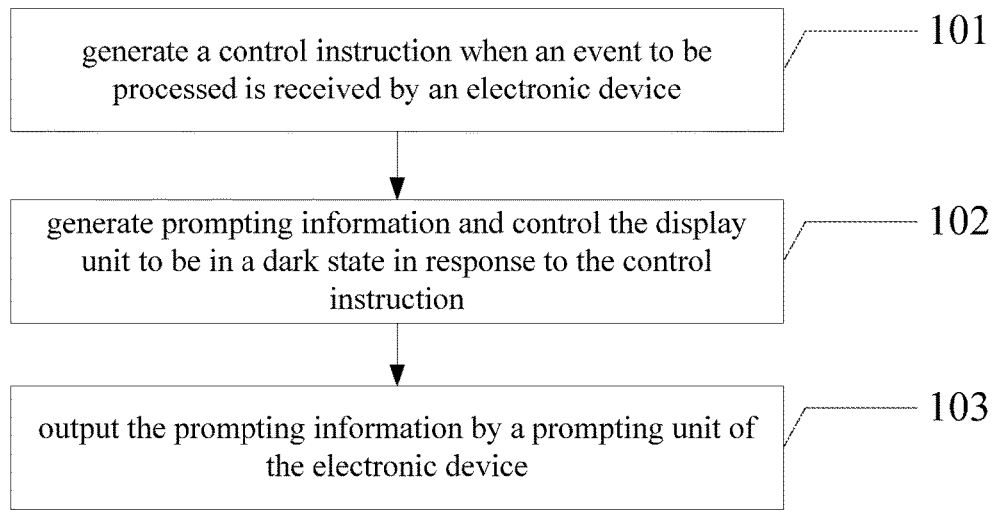
FIG. 1 is a flow chart of an information processing method according to an embodiment of the present disclosure.

FIG. 1 is a flow chart of an information processing method according to an embodiment of the present disclosure. The method includes the following steps S101 to S103.

Step 101, generating a control instruction when an event to be processed is received by the electronic device.

It should be noted that a display unit and a prompting unit are provided in the electronic device according to the embodiment of the present disclosure. In the prior art, when an event to be processed is received by the electronic device, the electronic device will directly start the prompting unit and the display unit in the electronic device, where the prompting unit may include a sound prompting unit and a vibration prompting unit, so that the electronic device can well prompt the user after the prompting unit and the display unit are started. However, if the user is not near the electronic device, the prompting information of the electronic device can not reach the user, thereby causing a power consumption waste of the electronic device. In view of the above, in the embodiment of the present disclosure, the electronic device does not directly start all of the prompting unit and the display unit after receiving the processing information, but generates a control instruction for controlling the prompting unit and the display unit.

After generating the control instruction, the electronic device performs step 102 and step 103.

Step 102, generating prompting information and controlling the display unit to be in a dark state in response to the control instruction.

Step 103, outputting the prompting information by a first prompting unit of the electronic device.

After generating the control instruction, the electronic device responds the control instruction. The control instruction controls the first prompting unit in the electronic device to generate prompting information, that is, the first prompting unit in the electronic device receives the control instruction, and then generates corresponding prompting information based on the control instruction. The control instruction is also transmitted to the display unit of the electronic device, and the display unit of the electronic device is not started but in a dark state after receiving the control instruction. In other words, if the prompting unit of the electronic device includes a sound prompting unit (for example, a speaker) and a vibration prompting unit (for example, a vibration sensor), after the control instruction is received by the electronic device, the display unit of the electronic device remains in a locked state, i.e., a non-illuminated state, and the sound prompting unit and the vibration prompting unit of the electronic device output the prompting information correspondingly.

For example, if the electronic device is a mobile phone which is provided with a sound prompting device and a vibration prompting device, the mobile phone, when receiving an incoming call request or a short message, generates a control instruction, which will be transmitted to the sound prompting device, the vibration prompting device and the display unit. The sound prompting device of the mobile phone generates a corresponding sound prompting information after receiving the control instruction; the vibration prompting device of the mobile phone generates a vibration prompting information after receiving the control instruction; and the display screen of the mobile phone remains in a locked state after receiving the control instruction, that is, the display screen of the mobile phone is not illuminated, and thus the prompting power consumption is reduced effectively.

In addition, in the embodiment of the present disclosure, a detecting device of the electronic device is detecting whether an operator is in a predetermined region of the electronic device while the electronic device is generating the control instruction, that is, the detecting device of the electronic device detects whether an operator is in a predetermined region of electronic device and generates a detection result. A display starting instruction is generated if the detection result indicates that an operator is in the predetermined region, and based on the display starting instruction, the electronic device starts the display unit of the electronic device, i.e., illuminates the display unit, to make the display unit be in an illuminated state, and the content of the event to be processed is displayed on the display unit of the electronic device.

In the above embodiment of the mobile phone, after the prompting information is output by the prompting device of the mobile phone, a camera provided in the mobile phone may collect images in the region corresponding to the mobile phone, that is, when there is an incoming call request or a short message on the mobile phone, the camera of the mobile phone collects image information in the region corresponding to the mobile phone. The mobile phone then analyzes the image information and determines whether there is a user image in the image information based on the analyzed content. The mobile phone generates a display starting instruction if it is analyzed by the mobile phone that a user image is in the image information, and starts the display screen based on the display starting instruction, to make the display screen be in an illuminated state, and the content of the incoming call request or the short message is displayed on the display screen.

A proximity sensor may also be provided in the mobile phone in the embodiment of the present disclosure. The proximity sensor is also able to detect whether an operator is in the predetermined region (for example, the detection range of the proximity detecting unit in the mobile phone is 3 cm). That is, when a user's hand approaches the display screen of the mobile phone and has a distance with the display screen smaller than 3 cm, the proximity sensor of the mobile phone detects that the user's hand is approaching, and a display starting instruction may be generated. The mobile phone starts the display unit to display based on the display starting instruction and the content of the incoming call request or the short message is display on the display unit. Therefore, a timely prompt is given to the user by the mobile phone, and the prompting power consumption of the electronic device may be reduced. Furthermore, the electronic device may determine whether the display unit needs to be started by detecting an operator, thereby reducing the waste of the prompting power consumption.

In addition, an infrared detecting apparatus may be provided in the mobile phone in the embodiment of the present disclosure. The infrared detecting device can detect infrared information in the region corresponding to the mobile phone, and then the mobile phone compares the collected infrared information with predetermined infrared information by determining whether the amount of the collected infrared information exceeds the predetermined amount of the infrared information. The mobile phone generates a display starting instruction if it is determined that the amount of the collected infrared information exceeds the predetermined amount of the infrared information, and then starts the display unit of the mobile phone correspondingly based on the display starting instruction, where the content of the incoming call request or the short message is displayed on the display unit.

It can be seen that in the above embodiment, after the information to be processed is received by the electronic device, the electronic device does not directly start the display unit, but determines whether the display unit needs to be started by detecting whether an operator is in the predetermined region of the electronic device, thereby solving the technical problem in the prior art that when an event to be processed is received by an electronic device, the electronic device will start all of the prompting devices to prompt the user, the promoting power consumption of the electronic device is high and the promoting power consumption will be waste if the user is outside of the prompting region. Therefore, the waste of the promoting power consumption of the electronic device is effectively reduced, and the efficiency of information prompting of the electronic device is also improved.

Furthermore, in the embodiment of the present disclosure, in order to further reduce the waste of prompting power consumption of the electronic device and improve the efficiency of prompting of the electronic device, the electronic device detects the duration for outputting the prompting information when the prompting information is output from the prompting unit, generates an execution instruction when the duration for outputting the prompting information reaches a predetermined threshold, and then adjusts the output intensity of the prompting unit of the electronic device from a first intensity to a second intensity based on the execution instruction, where the second intensity is lower than the first intensity.

Here, a mobile phone is still taken as an example. When an incoming call request is received by a mobile phone, prompting information is output simultaneously by the vibration prompting device and the sound prompting device of the mobile phone. The vibration prompting device vibrates continuously, and the sound prompting device outputs sounds continuously. In the prior art, the vibration prompting device and the sound prompting device of the mobile phone output prompting information in a same intensity even if no one answers the incoming call, therefore, the prompting output of the mobile phone is an ineffective output when the user is not near the mobile phone and the vibrating prompting and the sound output prompting are both promptings of high energy consumption. However, in the embodiment of the present disclosure, the mobile phone detects the duration for outputting the prompting information by the vibration prompting device and the sound prompting device when there is an incoming call request, generates an execution instruction when the duration for outputting the prompting information exceeds a predetermined time period such as 7 seconds, and adjusts the prompting intensity of the vibration prompting device and the sound prompting device from a first intensity to a second intensity based on the execution instruction. In other words, the mobile phone reduces the output volume of the sound prompting device and the vibration intensity of the vibration prompting device (the first intensity and the second intensity are set in advance in the embodiment of the present disclosure).

When the user is not near the electronic device, the waste of power consumption of the prompting information of the electronic device may be reduced effectively by reducing the prompting intensity of the prompting device, thereby increasing the stand-by time of the electronic device.

Furthermore, in the embodiment of the present disclosure, after reducing the prompting intensity of the prompting unit, the electronic device continues to detect the duration for outputting the prompting information by the prompting unit. The electronic device stops the prompting unit directly when the duration for outputting the prompting information exceeds a second time period (for example, 15 seconds) predetermined in the electronic device, therefore, the prompting unit stops outputting the prompting information. Certainly, in the embodiment, only the output of the prompting information of the prompting unit is stopped, but the event to be processed is not refused. The electronic device will restart the prompting unit to output the prompting information when the electronic device detects an operator and when the event to be processed is still on the electronic device.

For example, the mobile phone continues to detect the prompting duration of the vibration prompting device and the sound prompting device after reducing the prompting intensity of the sound prompting device and the vibration prompting device, and stops the vibration prompting device and the sound prompting device when the prompting duration exceeds 15 seconds, in this case, the incoming call request is not refused directly, but only the sound prompting device and the vibration prompting device of the mobile phone are stopped. The mobile phone will restart the vibration prompting device and the sound prompting device when detecting that an operator approaches in the duration of the incoming call request. In this way, the waste of prompting power consumption of the mobile phone may be reduced more effectively.

The technical solutions according to the present disclosure will be further described below in conjunction with a specific application scenario.

Here, a mobile phone is still taken as an example in the embodiment. The mobile phone firstly starts the sound prompting device and the vibration prompting device of the mobile phone when receiving an incoming call request, and in the embodiment, the mobile phone does not start the display screen directly, but detects whether a user is in a predetermined region of the mobile phone or whether a user's hand approaches the mobile phone. The mobile phone starts the display screen of the mobile phone directly and displays content of the incoming call request on the display screen when it is detected that a user is in the predetermined region or a user's hand approaches the mobile phone.

If the mobile phone does not detect that a user is in the predetermined region or a user's hand approaches the mobile phone, the mobile phone obtains the duration for outputting the prompting information by the sound prompting device and the vibration prompting device of the mobile phone, reduces the volume of the output sound of sound prompting device and the vibration intensity of the vibration prompting device when the duration for outputting the prompting information exceeds 7 seconds, and thus the power consumption of the prompting devices may be reduced effectively.

In this case, if there is still no user to process the information to be processed in the mobile phone, the mobile phone continues to detect the prompting duration of the sound prompting device and the vibration prompting device. When the prompting duration exceeds 15 seconds, the mobile phone stops the sound prompting device and the vibration prompting device directly, and in this case, the incoming call request is not refused. In the duration of the incoming call request, the mobile phone will start the display screen, the sound prompting device and the vibration prompting device when it is detected that a user is in the predetermined region or a user's hand approaches the mobile phone.

Figure 2:
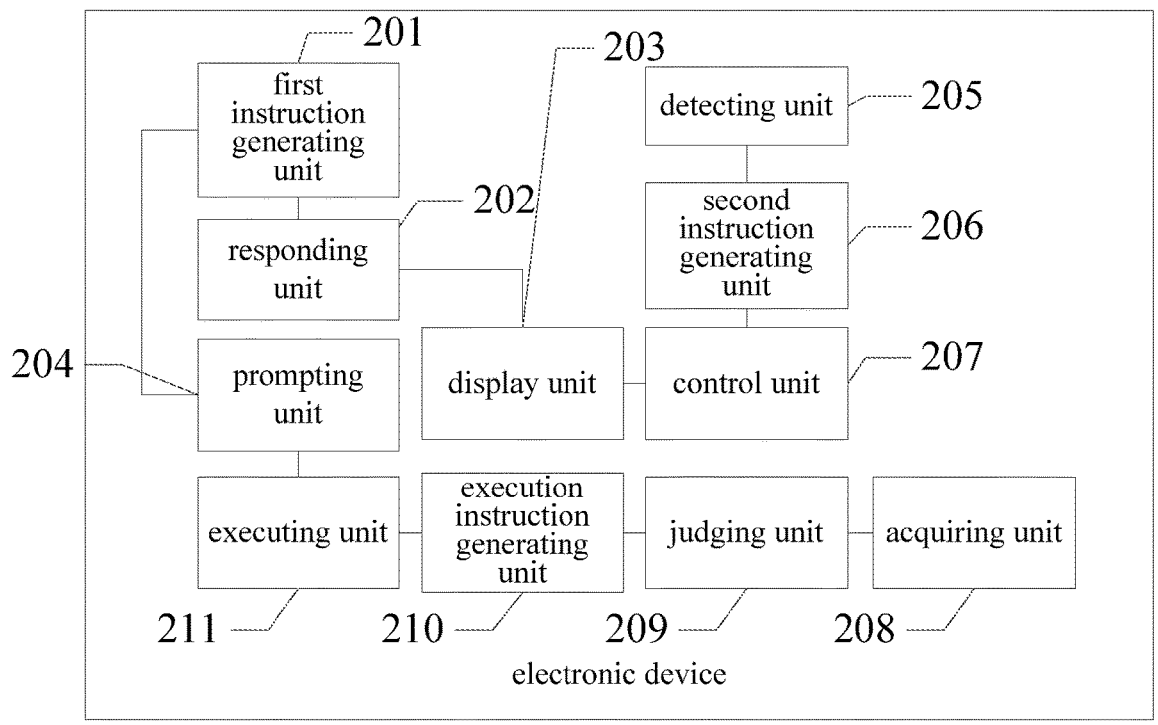
FIG. 2 is a schematic structural diagram of an electronic device according to an embodiment of the present disclosure.

Corresponding to the information processing method of the present disclosure, an electronic device is further provided according to an embodiment of the present disclosure. FIG. 2 is a schematic structural diagram of an electronic device according to an embodiment of the present disclosure, the electronic device includes:

a first instruction generating unit 201, adapted to generate a control instruction when an event to be processed is received by the electronic device;

a responding unit 202, adapted to generate prompting information and control a display unit 203 to be in a dark state in response to the control instruction;

a prompting unit 204, adapted to output the prompting information by a first prompting unit;

a detecting unit 205, adapted to detect whether an operator is in a predetermined region corresponding to the electronic device and to generate a detection result;

a second instruction generating unit 206, adapted to generate a display starting instruction if the detection result indicates that an operator is in the predetermined region;

a control unit 207, adapted to start the display unit based on the display starting instruction, to make the display unit be in an illuminated state;

an acquiring unit 208, adapted to acquire a first duration during which the prompting information is output by a sound prompting unit and/or a vibration prompting unit;

a judging unit 209, adapted to judge whether the first duration exceeds a first predetermined time period and to generate a first judgment result;

an execution instruction generating unit 210, adapted to generate an execution instruction if the first judgment result indicates that the first duration exceeds the first predetermined time period; and an executing unit 211, adapted to adjust output intensity of the prompting information of the sound prompting unit and/or the vibration prompting unit from a first intensity to a second intensity based on the execution instruction, where the second intensity is lower than the first intensity.

When an event to be processed is received by the electronic device, the first instruction generating unit 201 of the electronic device generates a control instruction, and transmits the control instruction to the prompting unit 204 and the control unit 202 of the electronic device. The control unit 202 controls the display unit 203 of the electronic device to be in a non-illuminated state and the prompting unit 204 outputs prompting information based on the control instruction. After the prompting information is output by the prompting unit 204, the detecting unit 205 of the electronic device detects whether an operator is in a predetermined region corresponding to the electronic device and generates a detection result, and then the detecting unit 205 transmits the detection result to the second instruction generating unit 206. If the detection result indicates that an operator is in the predetermined region, the second instruction generating unit 206 generates a display starting instruction and transmits the display starting instruction to the control unit 207. The control unit 207 starts the display unit to make the display unit be in an illuminated state based on the display starting instruction.

If no operator is detected by the electronic device, the acquiring unit 208 of the electronic device acquires a first duration during which the prompting information is output by the sound prompting unit and/or the vibration prompting unit, then the judging unit 209 judges whether the first duration exceeds a first predetermined time period and generates a first judgment result. If the first judgment result indicates that the first duration exceeds the first predetermined time period, the execution instruction generating unit 210 generates an execution instruction, and the executing unit 211 adjusts the output intensity of the prompting information of the sound prompting unit and/or the vibration prompting unit from a first intensity to a second intensity based on the execution instruction, where the second intensity is lower than the first intensity.

The one or more embodiments according to the present disclosure have at least the following technical effects or advantages.

In the embodiments of the present disclosure, after information to be processed is received by the electronic device, the electronic device does not directly start the display unit, but determines whether the display unit needs to be started by detecting whether an operator is in a predetermined region of the electronic device, thereby solving the technical problem in the prior art that when an event to be processed is received by an electronic device, the electronic device will start all of the prompting devices to prompt the user, the promoting power consumption of the electronic device is high and the promoting power consumption will be waste if the user is outside of the prompting region. Therefore, the waste of the promoting power consumption of the electronic device is effectively reduced, and the efficiency of information prompting of the electronic device is also improved.

In the embodiments of the present disclosure, if the information to be processed on the electronic device is not processed in a predetermined prompting time period, the output intensity of the prompting information of the prompting unit in the electronic device is reduced, thus the waste of power consumption of the prompting unit in the electronic device may be reduced, and the stand-by time of the electronic device may be increased.

It is to be understood by those skilled in the art that the embodiments of the disclosure may be provided as a method, a system or a computer program product. Therefore, the disclosure may be implemented by hardware completely, software completely or combination of hardware and software. Moreover, the disclosure may be implemented by a computer program product on one or more computer readable storage medium (including but not limited to a magnetic storage, a CD-ROM, and an optical storage) including computer readable program codes.

The disclosure is described by referring to the flowcharts and/or block diagrams of the method, device (system) and computer program product according to the embodiments of the disclosure. It is to be understood that each of the flowcharts and/or block diagrams and the combination thereof may be implemented by computer program instructions. These computer program instructions may be provided in a general-purpose computer, a dedicated computer, an embedded processor or a processor of other programmable data processing device, so as to generate a machine, to make the instructions executed by the processor of the computer or other programmable data process device implement the function of the module specified in one or more steps in the flowchart and/or one or more blocks in the block diagram.

These computer program instruction may also be stored in the computer readable storage that is able to direct the computer or other programmable data processor to operate in a particular manner, so that the instructions stored in the computer readable storage achieve a product including the instruction apparatus which can implement the function specified in one or more steps in the flowchart and/or one or more blocks in the block diagram.

These computer program instructions may be loaded into the computer or other programmable data processor, so that a series of operation steps may be performed on the computer or other programmable apparatus to implement the computer-implemented process, thus the instructions executed on the computer or other programmable apparatus may implement the functional steps specified in one or more steps in the flowchart and/or one or more block in the block diagram.

Apparently, various modifications and variations may be made by those skilled in the art without deviating from the spirit and scope of the disclosure. Thus, if these modifications and variations belong to the scope of the claim and the equivalent technique of the disclosure, the disclosure intends to contain these modifications and variations.

The invention claimed is:

1. An information processing method, which is applied to an electronic device, the electronic device comprising a display unit and a first prompting unit, wherein the method comprises:
   generating a control instruction when an event to be processed is received by the electronic device, the event to be processed being any one event from all events to be processed including an incoming call request, a new short message, and a new email;
   generating prompting information and controlling the display unit to be in a dark state in response to the control instruction;
   outputting the prompting information by the first prompting unit;
   wherein in a case that the first prompting unit is a sound prompting unit and/or a vibration prompting unit, the method further comprises, after outputting the prompting information by the first prompting unit,
   acquiring a first duration during which the prompting information is output by the sound prompting unit and/or the vibration prompting unit;
   judging whether the first duration exceeds a first predetermined time period and generating a first judgment result;

generating an execution instruction if the first judgment result indicates that the first duration exceeds the first predetermined time period; and adjusting output intensity of the prompting information of the sound prompting unit and/or the vibration prompting unit from a first intensity to a second intensity based on the execution instruction, wherein the second intensity is lower than the first intensity;

wherein the method further comprises, after adjusting the output intensity of the prompting information of the sound prompting unit and/or the vibration prompting unit from the first intensity to the second intensity, acquiring a second duration during which the prompting information is output by the sound prompting unit and/or the vibration prompting unit;

judging whether the second duration exceeds a second predetermined time period and generating a second judgment result;

generating a stopping instruction if the second judgment result indicates that the second duration exceeds the second predetermined time period; and stopping outputting the prompting information by the sound prompting unit or the vibration prompting unit based on the stopping instruction.

2. The method according to claim 1, wherein the method further comprises, after the outputting the prompting information by the first prompting unit, detecting whether an operator is in a predetermined region corresponding to the electronic device and generating a detection result;

generating a display starting instruction if the detection result indicates that an operator is in the predetermined region; and starting the display unit based on the display starting instruction, to make the display unit be in an illuminated state.

3. The method according to claim 2, wherein the detecting whether an operator is in a predetermined region corresponding to the electronic device and generating a detection result comprises:

collecting image information in the predetermined region by an image collecting apparatus in the electronic device; and determining whether an operator is in the predetermined region by analyzing the image information, and generating the detection result.

4. The method according to claim 2, wherein the detecting whether an operator is in a predetermined region corresponding to the electronic device and generating a detection result comprises:

acquiring first infrared information in the predetermined region by an infrared detection apparatus in the electronic device; and determining whether an operator is in the predetermined region by analyzing the first infrared information, and generating the detection result.

5. The method according to claim 1, wherein the first prompting unit is a speaker or a vibration sensor.

6. The method according to claim 1, wherein the first prompting unit is a speaker or a vibration sensor.

7. An electronic device, comprising:
a first instruction generating unit, adapted to generate a control instruction when an event to be processed is received by the electronic device, the event to be processed being any one event from all events to be processed including an incoming call request, a new short message, and a new email;

a responding unit, adapted to generate prompting information and control a display unit to be in a dark state in response to the control instruction; and a prompting unit, adapted to output the prompting information;

wherein in a case that the prompting unit is a sound prompting unit and/or a vibration prompting unit, the electronic device further comprises:

an acquiring unit, adapted to acquire a first duration and a second duration during which the prompting information is output by an sound prompting unit and/or a vibration prompting unit;

a judging unit, adapted to judge whether the first duration exceeds a first predetermined time period and to generate a first judgment result;

an execution instruction generating unit, adapted to generate an execution instruction if the first judgment result indicates that the first duration exceeds the first predetermined time period, and a stopping instruction if a second judgment result indicates that the second duration exceeds a second predetermined time period; and an executing unit, adapted to adjust output intensity of the prompting information of the sound prompting unit and/or the vibration prompting unit from a first intensity to a second intensity based on the execution instruction, wherein the second intensity is lower than the first intensity and stop outputting the prompting information by the sound prompting unit or the vibration prompting unit based on the stopping instruction.

8. The electronic device according to claim 7, further comprising:

a detecting unit, adapted to detect whether an operator is in a predetermined region corresponding to the electronic device and to generate a detection result;

a second instruction generating unit, adapted to generate a display starting instruction if the detection result indicates that an operator is in the predetermined region; and a control unit, adapted to start the display unit based on the display starting instruction, to make the display unit be in an illuminated state.

9. The electronic device according to claim 8, wherein the detecting unit comprises:

an image collecting module, adapted to collect image information in the predetermined region by an image collecting apparatus in the electronic device; and an analyzing module, adapted to analyze the image information to determine whether an operator is in the predetermined region and to generate the detection result.

10. An information processing method for an electronic device, the electronic device comprising a display unit and a first prompting unit, the method comprising:

generating a control instruction when an event to be processed is received by the electronic device, the event to be processed being one of an incoming call request, a new short message, and a new email;

generating prompting information and controlling the display unit to be in a dark state in response to the control instruction; and outputting the prompting information by the first prompting unit; and wherein in a case that the first prompting unit is a sound prompting unit and/or a vibration prompting unit, the method further comprises, after outputting the prompting information by the first prompting unit, acquiring a first duration during which the prompting information is output by the sound prompting unit and/or the vibration prompting unit;
judging whether the first duration exceeds a first predetermined time period and generating a first judgment result;
generating an execution instruction if the first judgment result indicates that the first duration exceeds the first predetermined time period; and
adjusting output intensity of the prompting information of the sound prompting unit and/or the vibration prompting unit from a first intensity to a second intensity based on the execution instruction, wherein the second intensity is lower than the first intensity;
wherein the method further comprises, after adjusting the output intensity of the prompting information of the sound prompting unit and/or the vibration prompting unit from the first intensity to the second intensity,
acquiring a second duration during which the prompting information is output by the sound prompting unit and/or the vibration prompting unit;
judging whether the second duration exceeds a second predetermined time period and generating a second judgment result;
generating a stopping instruction if the second judgment result indicates that the second duration exceeds the second predetermined time period; and
stopping outputting the prompting information by the sound prompting unit or the vibration prompting unit based on the stopping instruction.

* * * * *